(12) United States Patent
Kjaer

(10) Patent No.: US 10,358,820 B2
(45) Date of Patent: Jul. 23, 2019

(54) MODULAR BUILDING SYSTEM AND A METHOD OF ASSEMBLING BUILDING ELEMENTS TO CONSTRUCT SUCH BUILDING SYSTEM

(71) Applicant: Nordic Build A/S, Svendborg (DK)

(72) Inventor: Nikolai Kjaer, Copenhagen (DK)

(73) Assignee: NORDIC BUILD A/S, Svendborg (DK)

( * ) Notice: Subject to any disclaimer, the term of this patent is extended or adjusted under 35 U.S.C. 154(b) by 12 days.

(21) Appl. No.: 15/321,612

(22) PCT Filed: Jun. 23, 2015

(86) PCT No.: PCT/EP2015/064140
§ 371 (c)(1),
(2) Date: Dec. 22, 2016

(87) PCT Pub. No.: WO2015/197634
PCT Pub. Date: Dec. 30, 2015

(65) Prior Publication Data
US 2017/0145691 A1 May 25, 2017

(30) Foreign Application Priority Data
Jun. 23, 2014 (EP) .................................. 14173433

(51) Int. Cl.
*E04B 1/00* (2006.01)
*E04C 1/00* (2006.01)
(Continued)

(52) U.S. Cl.
CPC ................ *E04C 2/292* (2013.01); *E04B 1/08* (2013.01); *E04B 1/14* (2013.01); *E04B 5/02* (2013.01);
(Continued)

(58) Field of Classification Search
CPC .......... E04B 1/14; E04B 5/02; E04B 2103/04; E04B 2103/06; E04C 2/34; E04C 2/292; E04C 2/322
(Continued)

(56) References Cited

U.S. PATENT DOCUMENTS 3,386,218 A * 6/1968 Scott ...................... E04B 1/6803
52/309.11
3,992,839 A * 11/1976 La Borde ................ E04B 2/721
52/275

(Continued)

FOREIGN PATENT DOCUMENTS

WO 200208537 A1 1/2002

OTHER PUBLICATIONS

International Search Report and Written Opinion for PCT/EP2015/064140, dated Aug. 28, 2015.
(Continued)

*Primary Examiner* — Joshua J Michener
*Assistant Examiner* — James J Buckle, Jr.
(74) *Attorney, Agent, or Firm* — Brinks Gilson & Lione

(57) ABSTRACT

The present invention concerns a modular building system comprising a plurality of building elements (1), which are assembled to form a building section, such as a wall, a floor and/or a ceiling, said building elements (1) each comprises an elongated insulation panel (2) having a first side (23) and an opposite second side (24) with two oppositely positioned end sides (25, 26) and two oppositely positioned panel contact sides (21, 22) therebetween, and at least one of said first and second sides (23, 24) are provided with a cover profile (3), which covers the width of the first side (23) and/or the second side (24), wherein said cover profile (3) has a base portion (31) at which the cover profile (3) is attached to the first or second side (23, 24) of the insulation
(Continued)

panel (2), and first and second side flange portions (32) on each side of the base portion (31); said first side flange portion (32) having a tongue (37) at the side edge (35), and said second side flange portion (32) having a groove (36) complementary to the tongue (37) adapted to receiving and interlocking the tongue (37) of a neighboring building element (1) and thereby assemble the two neighboring building elements (1, 1').

18 Claims, 13 Drawing Sheets

(51) Int. Cl.
  E04C 2/292    (2006.01)
  E04B 1/08     (2006.01)
  E04B 5/02     (2006.01)
  E04C 2/32     (2006.01)
  E04D 3/35     (2006.01)
  F16B 5/00     (2006.01)
  E04B 1/14     (2006.01)
  E04C 2/34     (2006.01)
(52) U.S. Cl.
  CPC .............. *E04C 2/322* (2013.01); *E04C 2/34* (2013.01); *E04D 3/352* (2013.01); *F16B 5/0016* (2013.01); *E04B 2103/04* (2013.01); *E04B 2103/06* (2013.01)
(58) Field of Classification Search
  USPC ..................................... 52/272, 582.1, 588.1
  See application file for complete search history.

(56) References Cited

U.S. PATENT DOCUMENTS

| | | | | |
|---|---|---|---|---|
| 4,037,377 A * | 7/1977 | Howell | ...................... | E04B 1/54 52/309.9 |
| 4,155,206 A * | 5/1979 | Player | ...................... | E04D 3/30 52/200 |
| 4,269,012 A * | 5/1981 | Mattingly | ............... | E04D 3/362 52/393 |
| 4,316,351 A * | 2/1982 | Ting | ........................ | E04C 2/292 52/309.9 |
| 4,389,823 A * | 6/1983 | Player | ...................... | E04D 3/28 52/200 |
| 4,438,614 A * | 3/1984 | Raith | .................... | E04B 2/7401 52/481.2 |
| 4,463,533 A * | 8/1984 | Mullet | .................... | E04D 3/352 52/394 |
| 4,476,659 A * | 10/1984 | Player | ...................... | E04D 3/30 52/404.1 |
| 4,918,898 A * | 4/1990 | McLeod, Jr. | ........... | E04F 13/12 52/478 |
| 4,936,078 A * | 6/1990 | Porter | ................... | E04B 1/6125 52/478 |
| 5,086,599 A * | 2/1992 | Meyerson | ............... | E04B 1/617 52/309.9 |
| 5,293,728 A * | 3/1994 | Christopher | .......... | F16B 5/0016 52/309.9 |
| 5,363,606 A * | 11/1994 | Esposito | .................... | E04B 7/22 52/11 |
| 5,404,686 A * | 4/1995 | Esposito | ................... | E04B 7/22 52/309.14 |
| 5,448,865 A * | 9/1995 | Palmersten | ........... | E04B 1/6129 52/309.9 |
| 5,613,338 A * | 3/1997 | Esposito | ................... | E04B 7/22 52/309.14 |
| 5,673,524 A * | 10/1997 | Gailey | ...................... | B32B 3/06 52/309.9 |
| 6,122,879 A * | 9/2000 | Montes | ............... | E04F 13/0876 52/309.9 |
| 6,314,701 B1 * | 11/2001 | Meyerson | ............... | E04C 2/292 52/309.9 |
| 6,586,085 B1 * | 7/2003 | Jella | .......................... | B32B 3/26 160/201 |
| 7,739,848 B2 * | 6/2010 | Trout | ..................... | E04D 3/355 52/309.15 |
| 2016/0194864 A1 * | 7/2016 | Walker | ..................... | E04B 1/40 52/745.06 |

OTHER PUBLICATIONS

Preliminary Report on Patentability for PCT/EP2015/064140, dated Dec. 27, 2016.

* cited by examiner

MODULAR BUILDING SYSTEM AND A METHOD OF ASSEMBLING BUILDING ELEMENTS TO CONSTRUCT SUCH BUILDING SYSTEM

RELATED APPLICATIONS

This application claims the benefit under 35 U.S.C § 371 of the filing date of International Patent Application No. PCT/EP2015/064140, having an international filing date of Jun. 23, 2015, which claims priority to European Patent Application No. 14173433.5, filed Jun. 23, 2014, the contents of both of which are incorporated herein by reference in their entirety.

The present invention relates to a modular building system and a method of assembling building elements to construct such building system.

US patent application no. 2003/0230038A1 describes modular structures constructed from interlocking double wall modules made of plate steel including tongue and groove elements used to position adjoining modules adjacent to one another, for example during the construction of a cell block. The disclosure concerns the provision of double wall modules with interlocking tongue and groove connection with the aim of providing properly aligned wall surfaces in an easy manner.

US patent application no. 2007/0213960A1 discloses a so-called "Loq-kit", which is a mass-produced modular building component system of interchangeable components for assembling single or multi-family houses. The building components are of three varieties: structural frame, in-fill, or snap-cladding components.

GB 2 318 809 A describes a modular construction made up of a floor assembly, a number of wall assemblies and a roof assembly which is supported on the walls. Each wall assembly consists of a number of identically sized load-bearing wall panels, which are joined by non-load bearing bridging members.

U.S. Pat. No. 5,528,871 relates to a kit to be used in the construction of a building. More specifically, there is described a kit to be used in the construction of a building, comprising a series of modular box-shaped units of particle board to be assembled together into a given plane to form a wall. These modular units comprising respective border portions and elongate aligning member.

The object of the present invention is to provide a modular building system which is easy to assemble and which has no thermal bridging.

This object is achieved by a modular building system comprising a plurality of building elements, which are assembled to form a building section, such as a wall, a floor and/or a ceiling, said building elements , being for use with an elongated insulation panel having a first side and an opposite second side with two oppositely positioned end sides and two oppositely positioned panel contact sides therebetween, at least one of said elements comprises: cover profiles, each of which are adapted to cover the width of the first side and the second side, respectively, wherein at least one of said cover profiles has a base portion being adapted to be attached to the first or second side of the insulation panel, and has first and second side flange portions on each side edge of the base portion; said first flange portion having interconnecting means for interconnecting with a second flange portion having complementary coupling means provided on a neighbouring building element so that the interconnected flange portions in cross section define a longitudinal dove tail.

The elongated building elements in the modular building system according to the invention are preferably made up by an insulation panel with a cover profile on each side. Hereby no thermal bridging occurs since there's no direct connection between the two cover profiles other than the insulation panel. The building elements can easily be assembled by the interlocking the profiles.

The structural strength of the dove tail between building elements provides structurally assembled building elements in a modular building system according to the invention. This is advantageous as this structural assembly also provides the insulation panels with load-bearing capabilities without a traditional framework and also because no additional connecting parts except for connections between sections are needed.

In a modular building system according to the invention, the cover profiles of the building elements will be on the exterior surface of the building and/or on the interior side of the walls, floor and roof of the building. Besides, the thermal and acoustic insulation properties of the insulation panels are not compromised by any thermal bridges and the between each of the cover profiles making up the exterior surface, and also the cover profiles making up the interior surface, ensures a water and vapour tight barrier on the building.

In the preferred embodiment of the invention, said first side flange portion having a tongue at the side edge, and said second side flange portion having a groove complementary to the tongue adapted to receiving and interlocking the tongue of a neighbouring building element and thereby assemble the two neighbouring building elements.

In the preferred embodiment of the invention, each of the flange portions of the cover profile comprises an inclined inner flange portion extending from the base portion to an intermediate portion parallel to the base portion, and from which an outermost side flange is provided which is perpendicular to the base portion, and that in said outermost side flange the tongue or groove, respectively, is formed. This provides a spring-like effect on the side flange portions and thereby on the tongue and the groove, so that this spring-like flexibility will bias the tongue of one profile into the groove of a neighbouring profile. The flexibility of the side flange portions also provides for easy disassembly of the cover profiles as will be discussed later on in the description.

Preferably, said cover profile is made of one piece of sheet metal which is folded into shape, said sheet preferably having a thickness of 0.5-1.5 mm, more preferably approx. 1.0 mm. Hereby, the profile can be produced in a cost-effective manner.

Preferably, a central ridge is provided on the base portion, said ridge preferably having a trapezoid cross-sectional shape. This provides extra stiffness to the profile and thereby to the building element. Furthermore, the assembly of side flange portions of two neighbouring building elements when assembled have the same shape as the ridge. This provides a regular exterior (or interior) surface made up by the cover profiles, which is advantageous as this facilitates easy mounting of brackets for building components or outer building façade cladding, for instance brackets of the type disclosed in PCT/DK2014/050148, which is hereby incorporated by reference.

The interlocking between the tongues and grooves preferably provides a wind and water-tight barrier. However, by the invention it is realised that the water-tightness of the interlocking assembly may be further improved by providing the tongue and/or the groove with a suitable coating or a sealant, such as a resilient deformable sealant, e.g. a silicone coating or sealant.

The insulation panel of the elongated building element is advantageously made of bound fibrous material, such as bound mineral wool fibres, preferably bound stone wool fibres. Furthermore, the insulation panel made of such fibrous material having a density of 60-100 kg/m³, preferably 70-80 kg/mm³ and a compression strength perpendicular to the cover profiles surface of >15 kN/m² measured according to European Standard EN 826. This is advantageous since the insulation panel thereby resists high loads as they commonly appear within building construction. Such loads may vary depending on the different building sections, respectively the location of the sections within a building. In an embodiment where the modular building system is made as a wall of building elements which are 250 in width, 350 mm in height and 3000 mm in length, with a cover profile of 1 mm thickness attached to one surface of the insulation panel and with ridges of 26 mm height, it is found that the vertical load which can be carried exceeds 5000 kg. A building element made for constructing a floor section was also tested for its resistance to bending. The building element is made of a cover profile of 1 mm thickness and fibrous insulation material of 70 kg/m³ and with the dimensions 250×450×6000 mm and was subjected to a load of 3000 kg. The deflections were minor and with a spot load on the middle of the building element a deflection of max. 28 mm was measured. In relation to enforce the bending resistance of a building element, when used as a roof or deck element, it is found advantageous to provide a plate between the contact sides of two abutting building elements. This plate is clamped between the building elements and fixed when the flanges of the cover profiles are assembled. The plate is preferably made of a high-density fibrous insulation material, such as a mineral fibrous material having a density of approx. 450-500 kg/m³.

In an embodiment of the invention, at least one of the building sections is a horizontally positioned floor subassembly of the building elements and wherein at least one second building section is a wall subassembly of building elements which is mounted on said floor subassembly via an assembly profile element. The assembly profile element preferably comprises an exterior first side profile with a receiving groove, an interior second side profile with a receiving groove, and with a central profile panel of insulation material mounted between said side profiles and mounted in the receiving grooves. Hereby, the assembly of a wall and floor section or a wall and ceiling/roof section may be provided without introducing any thermal bridges so that the thermal and acoustic properties of the modular building system according to the invention is not compromised. Accordingly, said central profile panel is made of a mineral fibrous material, more preferably said mineral fibrous material having a density of approx.450-500 kg/m³.

Advantageously, the interior second side profile also comprises an internal volume for the accommodation of building components. This allows for fitting electrical cables, sanitary tubing, etc. to be provided without penetrating the vapour-tight screen.

In a second aspect of the invention, there is provided a method of assembling building elements in a modular building system comprising a plurality of building elements, wherein the building elements each comprises an elongated insulation panel having a first side and an opposite second side with two oppositely positioned end sides and two oppositely positioned panel contact sides therebetween, and at least one of said first and second sides are provided with a cover profile, which covers the width of the first side and/or the second side, wherein said cover profile has a base portion at which the cover profile is attached to the first or second side of the insulation panel, and first and second side flange portions on each side of the base portion;

said first side flange portion having a tongue at the side edge, and said second side flange portion having a groove complementary to the tongue to receiving and interlocking the tongue of a neighbouring building element and thereby assemble the two neighbouring building elements; said method comprising the steps of providing a first building element and a second building element with their panel contact sides abutting each other, aligning the tongue of the cover profile on the first element with the groove in the cover profile of the second building element, and then pressing the tongue into the groove along the entire cover profile length and thereby structurally assemble the two neighbouring building elements.

Hereby, a simple and fast assembly of modular building elements is provided. Advantageously, the building elements are provided with profiles on both their first and their second sides, and that the step of pressing is performed on both sides of the building elements for the assembly of the two building elements. This ensures the thermal and acoustic insulation properties of the insulation panels are not compromised by any thermal bridges, but also provides a vapour-tight barrier on the building, since the tongue and groove assembly between each of the profiles provide a complete exterior surface, and likewise the profiles on the inside of the building elements make up the interior surface of the building.

The assembly of two building elements may comprise the step of pressing the inclined side flange portions on the two neighbouring profiles carrying the tongue and groove, respectively. This may be done using an appropriate tool with press rollers forcing the tongue to effortlessly snap-lock in the groove.

An advantage of the modular building system according to the invention is also that the building elements may easily be de-mounted from the building system again. Accordingly, the method of the second aspect preferably also comprises a subsequent step of disassembling the building system by forcing the tongue out of the groove in the profile assembly using an appropriate tool.

The invention is described in more detail in the following with reference to the accompanying drawings, in which:

In the specification is used the word: dovetail and ridge, they are be construed as the same technical means.

Figure 1:
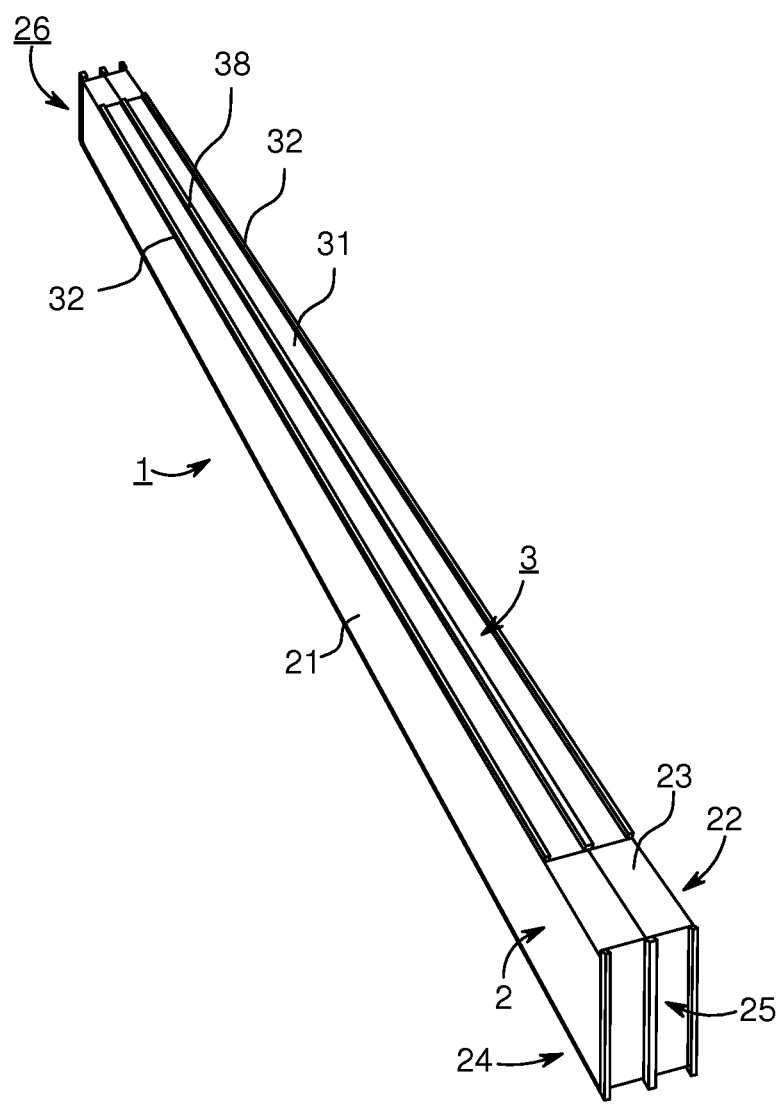
FIGS. 1-3 are perspective views of building elements according to a preferred embodiment of the invention.
Figure 2:
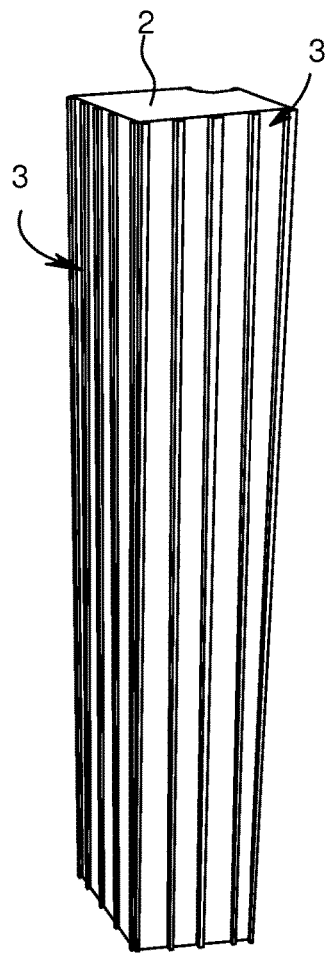
Figure 3:
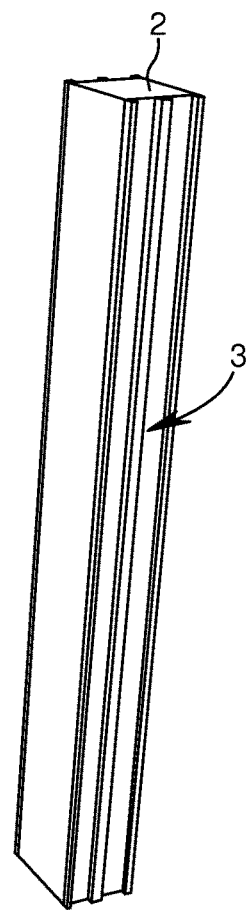

With reference to FIGS. 1-3, three embodiments of a building element 1 according to the invention is shown. Each building element 1 comprises an elongated insulation panel 2 which has two oppositely positioned panel contact sides 21, 22, two exterior and interior sides 23, 24, respectively, which may be referred to as a first side 23 and an opposite second side 24. The first and second sides 23, 24 have a length and a width which are constant along the length of the building element 1. Between these two first and second sides 23, 24 two oppositely positioned end sides 25 and 26 are also provided. At least the first side 23 is provided with a cover profile 3, which covers the entire width of the first side 23. Preferably, also the second side 24 and if necessary also the end sides 25, 26 are covered by cover profiles 3. In FIG. 1 a building element 1 which is designed for providing a horizontal structure of a modular building system is shown. In FIG. 2 a corner building element designed for vertical installation is shown and in FIG. 3 a building element 1 for vertical mounting is shown.

Figure 4:
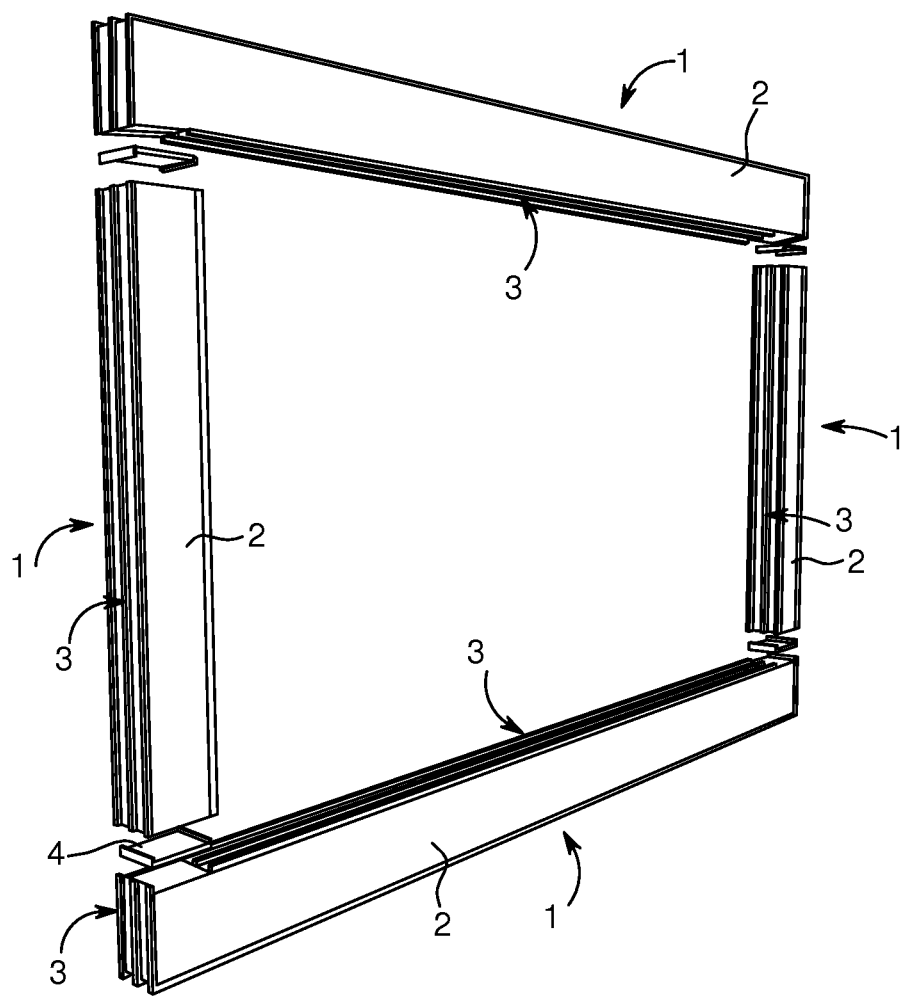
FIG. 4 is an exploded, perspective view of building elements in an assembly of a building section.
Figure 5:
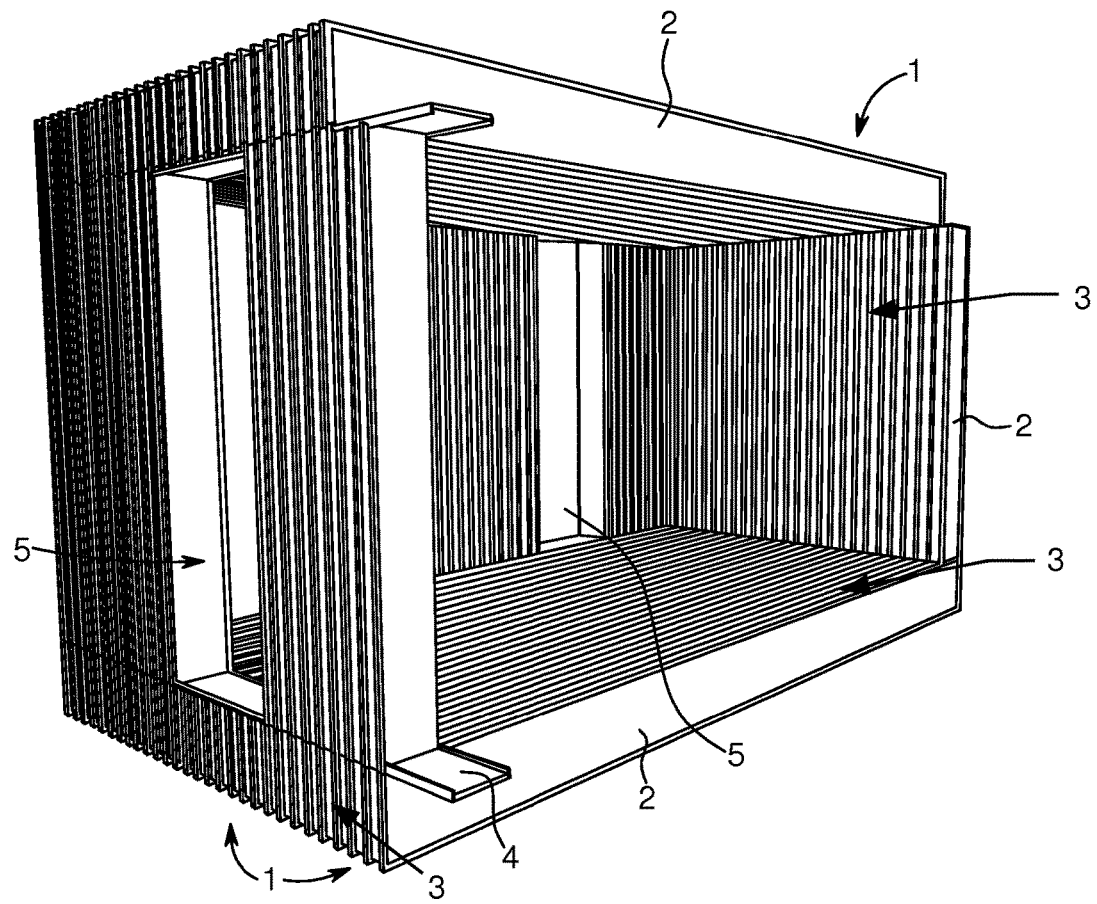
FIG. 5 is a perspective view of a modular building system with a number of building sections.

A plurality of building elements 1 may be assembled to form a building section including a wall, a floor and a ceiling portion, such as shown in the exploded view of FIG. 4. Between the vertically oriented wall building elements and the floor element and the ceiling building element, respectively, the assembly profile elements 4 are provided in order to ensure an unbroken thermally insulating section between the interior of the building section and the exterior thereof. The assembly profile element 4 is shown in more detail in FIG. 8. The building elements 1 provided in the configuration shown in FIG. 4, are then assembled with similar building elements 1 to form a modular building structure, as shown in FIG. 5. One or more building elements 1 may be omitted (or provided with shorter lengths—not shown) to form openings 5 for windows, doors or the like in the wall sections. The assembly profile elements 4 are preferably longer than the width of the building elements 1 so that an assembly profile element 4 spans a plurality of building elements, cf. FIG. 5.

Figure 6:
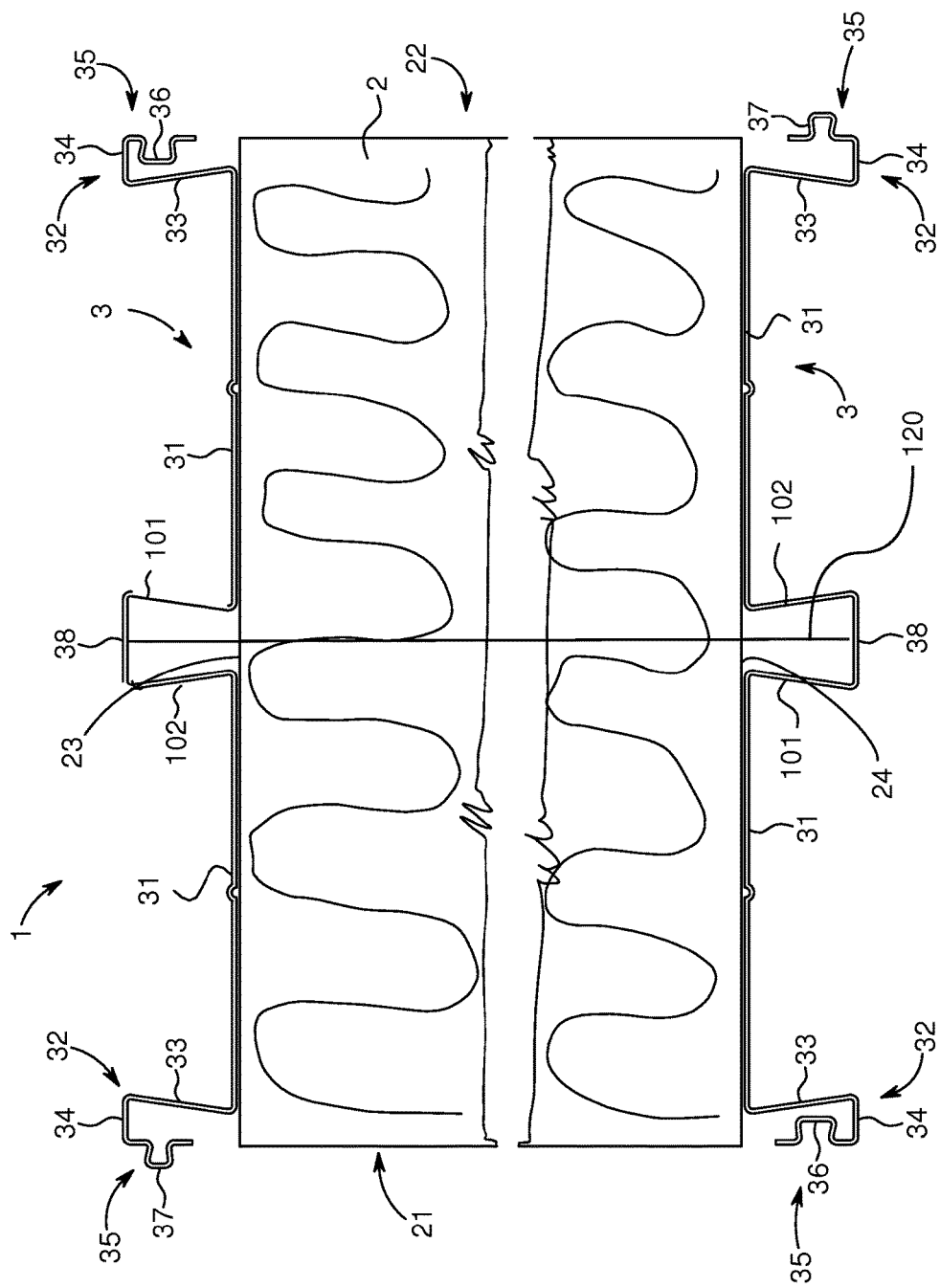
FIG. 6 is a cross-sectional view of a building element with a cover assembly profile on each side.
Figure 7:
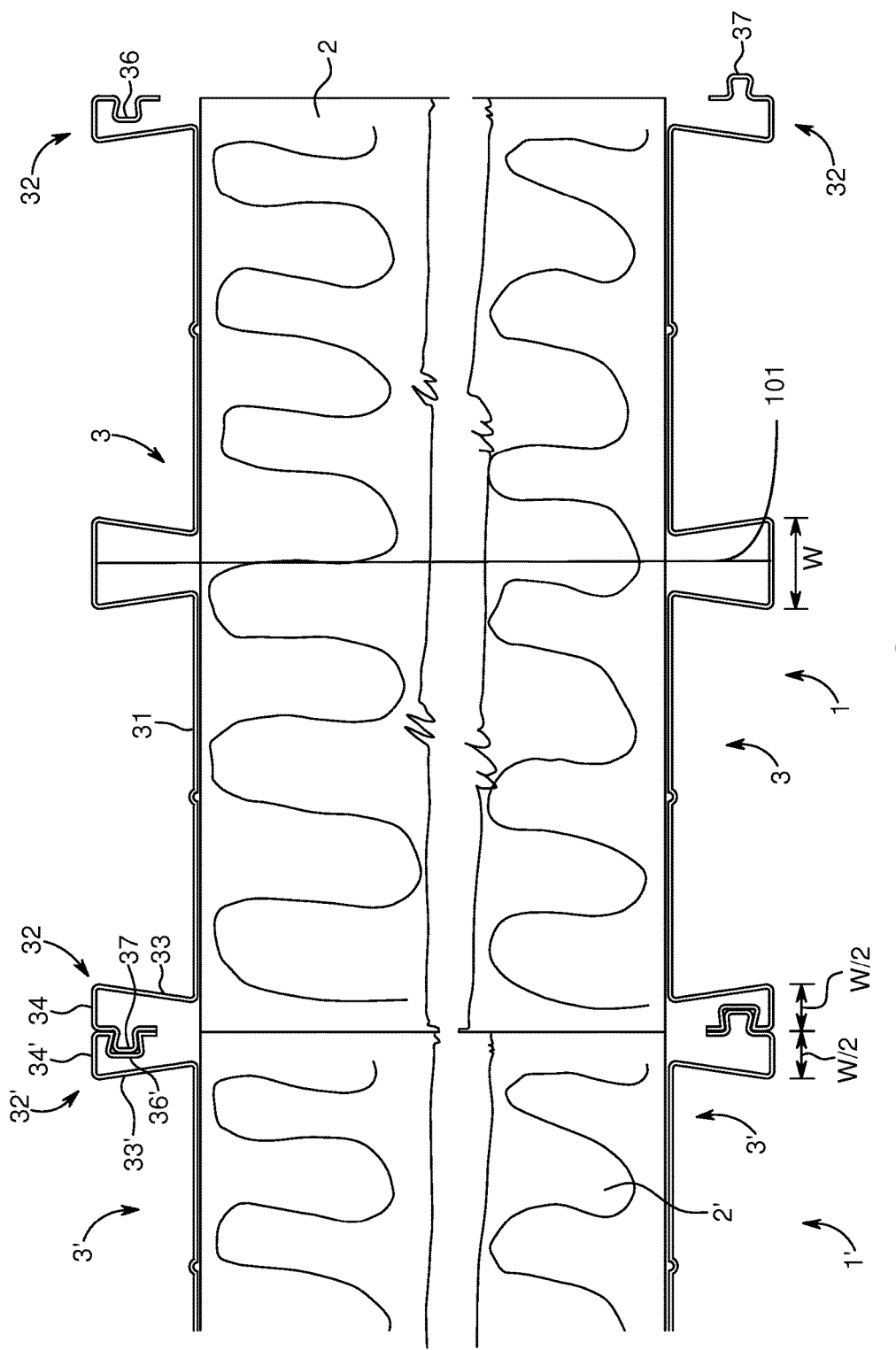
FIG. 7 is a cross-sectional view of an assembly of the building elements shown in FIG. 6.

A detailed view of the building element 1 is shown in FIG. 6 and an assembly thereof is shown in FIG. 7. The insulation panel 2 is preferably made of fibrous mineral wool, such as a mineral wool fibrous panel with a density of 70 kg/m3. The insulation panel 2 has two oppositely positioned building element contact sides 21, 22 and a first and second side 23, 24. The first side 23 and the second side 24 are preferably both provided with a cover profile 3 attached by an adhesive to the insulation panel 2 so that the cover profile 3 covers the entire width of the insulation panel 2.

The cover profile 3 has a base portion 31 at which the cover profile 3 is attached to the first or second sides 23, 24 of the insulation panel 2. The cover profile 3 is further provided with first and second side flange portions 32 on each side of the base portion 31. Said first side flange portions 32 are provided with a tongue 37 at one side edge, and said other side flange portion has a groove 36 complementary to the tongue 37 adapted for receiving and interlocking the tongue 37 of a neighbouring building element 1 (see FIG. 7) and thereby assemble the two neighbouring building elements 1, 1'. The cover profiles 3 are preferably formed from one piece of thin sheet metal, such as 0.5-1.5 mm, more preferably approx. 1.0 mm thickness. This provides an advantageous spring-like elastically effect so that a snap-locking effect between the tongue and groove can be established.

Each of the side flange portions 32 comprises an inclined inner flange portion 33 extending from the base portion 31 to an intermediate portion 34 parallel to the base portion 31, and from which an outermost side flange 35 is provided, which is perpendicular to the base portion 31, and that in said outermost side flange 35 the tongue 37 or groove 36, respectively, is formed.

At the centre of the cover profile 3, a central ridge 38 is provided on the base portion 31. This ridge 38 has a trapezoid cross-sectional shape. The assembly of side flange portions 32 of two neighbouring building elements 1, 1', when assembled, have the same shape as the ridge 38. As indicated in FIG. 7, the ridge 38 has a width W and each of the intermediate portions 34 are provided with a width W/2 so that the cover profiles 1, 1' when assembled show a regular exterior, respectively interior, surface which facilitates easy mounting of building components with brackets (not shown).

As shown in FIG. 6, a building element may be provided with insulation and two cover profiles and further be provided with a internal plate 120 extending across the longitudinal direction of the building element profiles. This plate extends, in the figure, from one ridge 38 to the opposite ridge. This plate provides the building element with an increased moment of inertia.

As shown in FIG. 7, the cover profiles 3, 3' of two neighbouring building elements 1, 1' are assembled to each other by the tongue and groove snap-connection of the two cover profiles 3, 3'. The side flange 32 of one cover profile 3 with a tongue 37 is connected to the groove 36' of a side flange 32' of the abutting cover profile 3'. The tongue 37, 37' of one side 32, 32' of a cover profile 3, 3' fits into the groove 36, 36' of the other side 32, 32' of the abutting cover profile 3, 3'. In the bottom of the groove 37 a silicone seal could be provided and/or the tongue could be coated with a resilient sealant in order to ensure a water-tight snap-locking assembly between the cover profiles 3, 3'. It is by the invention realised that even without any sealant, the tongue and groove snap-connection may be provided which is wind and water-tight to ensure a complete external and/or internal building cover in the assembled building system according to the invention.

Figure 6A:
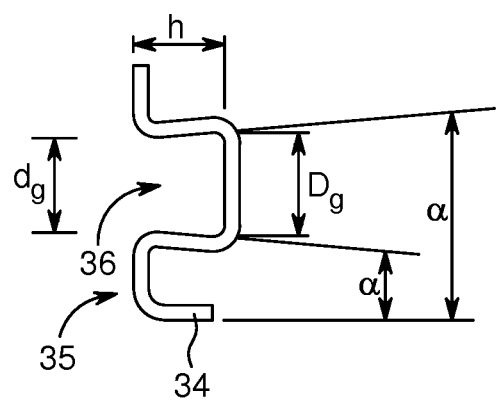
FIGS. 6A and 6B are detailed cross-sectional views of the side flange portions of a cover profile of FIG. 6.
Figure 6B:
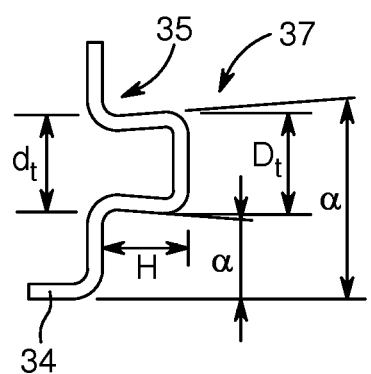

FIGS. 6A and 6B show the designs of the tongue and the groove design formed in the side flange portions 32 of the cover profile 3, as shown in FIG. 6. In FIG. 6A, the groove 36 is formed by bending the sheet metal into shape so that the intermediate portion 34 is followed by the side edge portion 35 in which the groove 36 is formed. The groove 36 is generally trapezoid in cross-sectional shape having a smaller distance $d_g$ at the entrance to the groove 36 compared to the bottom of the groove 36, where the distance is $D_g$. The sides of the groove 36 are inclined by an angle a relative to the intermediate portion, which is generally parallel with the base portion and thereby with the first, respectively, second side 23, 24 of the building element 1. The inclination a is in a preferred embodiment approx. 5°.

As shown in FIG. 6B, the tongue 37 is formed in the side edge portion 35 by bending the sheet metal into shape so that the side edge portion 35 extends perpendicular to the intermediate portion 34.

Like the groove 36 in FIG. 6A, the tongue 37 in FIG. 6B is generally trapezoid in cross-sectional shape having a smaller distance $d_t$ at the base of the tongue 37 compared to the distal end of the tongue 37, where the distance is $D_t$. The sides of the tongue 37 are inclined by an angle α relative to the intermediate portion, which is generally parallel with the base portion and thereby with the first, respectively, second side 23, 24 of the building element 1. This inclination angle α is the same or essentially the same for the tongue 37 and the groove 36.

As it is apparent from FIGS. 6A and 6B, the tongue 37 and the groove 36 are substantially complementary in shape. However, in order to secure a firm snap-fit interlocking between two cover profiles 3, 3' (see FIG. 7) the distance $D_t$ of the distal end of the tongue 36 is equal or smaller than $D_g$ of the groove 36 but somewhat wider than the entrance opening $d_g$ of the groove 36. Also the base of the tongue 37 has the distance $d_t$ which is equal to or slightly smaller than the entrance opening $d_g$ of the groove 36. However, due to the flexibility of the side flange portions 32 dt might even be bigger than dg in case an even stronger interlocking is required.

In an exemplary embodiment, the building element 1 is produced with a width of 250 mm. The height of the side flange portions 32 is 17 mm and the tongue 37 or groove 36 is formed 6 mm from the intermediate portion. The tongue is 5.80 mm in height H with a tolerance of 0.10 mm. The depth h of the groove 36 is 6.00 mm with a tolerance of 0.10 mm. The $d_t$ is 6.18±0.10 mm and $D_t$ is 6.74 mm. The corresponding dimensions of the groove 36 in this embodiment are $d_g$ is 6.27±0.10 mm and $D_g$ is 6.87 mm.

Figure 8:
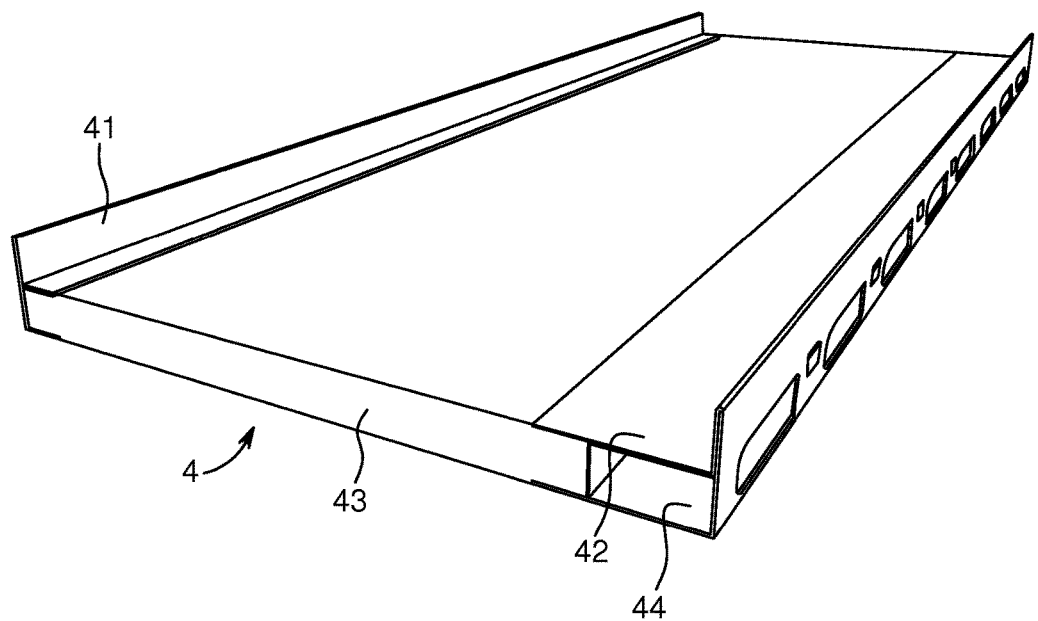
FIG. 8 is a perspective view of an assembly profile element.

As shown in FIGS. 4 and 5, the building sections such a horizontally positioned floor subassembly of the building elements 1 and the wall subassembly of building elements 1 is mounted on the floor subassembly via an assembly profile element 4. In FIG. 8, the assembly profile element 4 is shown in more detail. The assembly profile element 4 comprises an exterior first side profile 41 with a receiving groove, an interior second side profile 42 with a receiving groove, and with a central profile panel 43 of insulation material mounted between said side profiles 41, 42 and mounted in the receiving grooves. The central profile panel 43 is preferably made of a bound mineral fibrous material, preferably a bound stone wool fibre material having a density of approx. 450-500 kg/m³. The interior second side profile 42 also comprises an internal volume 44 for the accommodation of building components, such as electrical cables, pipes, etc. (not shown).

In order to press the cover profiles 3, 3' into the snap-lock interlocking and to disassemble the profiles again, a tool could preferably be used. In FIGS. 9-12 examples on such tools are shown.

Figure 9:
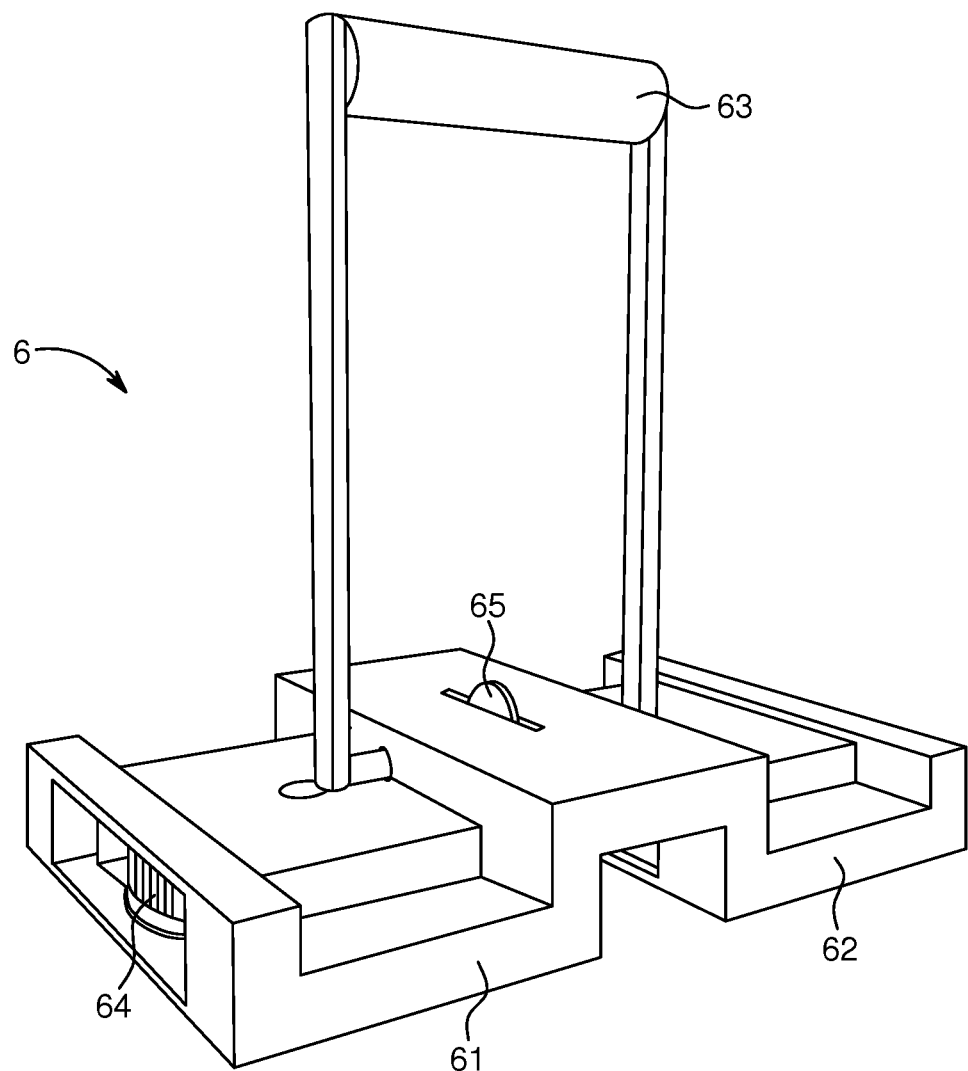
FIGS. 9 and 10 are perspective views of a tool for de-mounting the cover profiles of the building elements.
Figure 10:
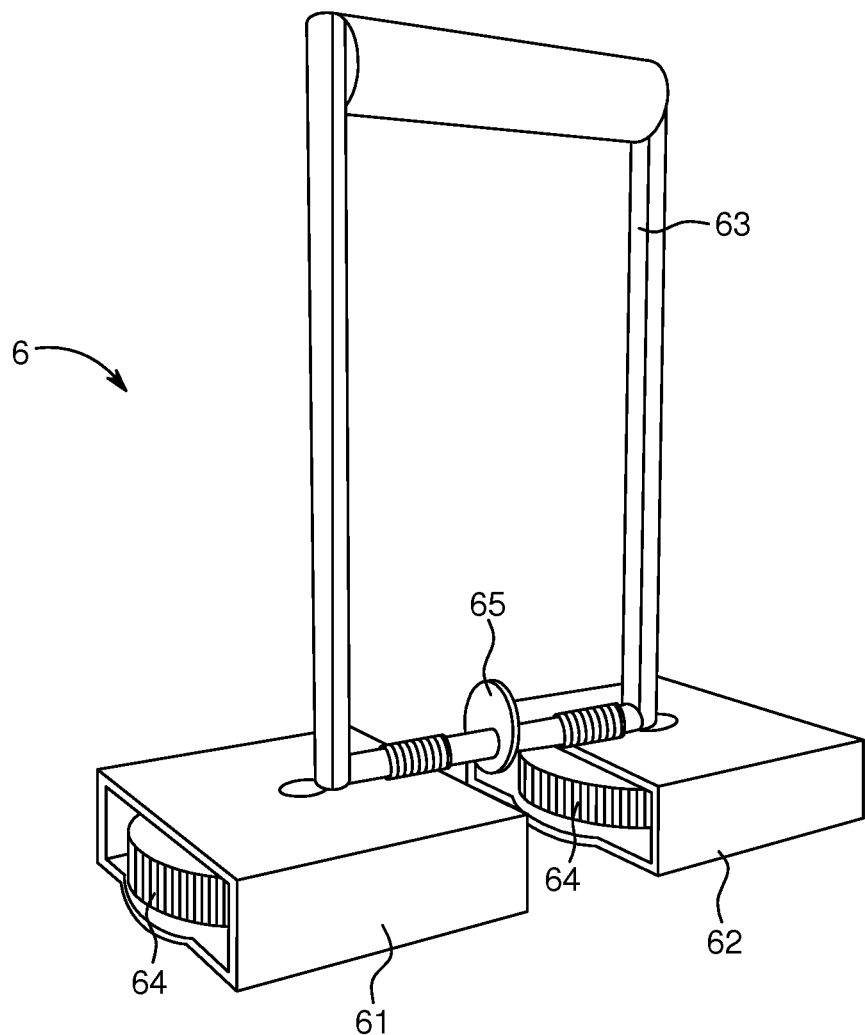
Figure 11:
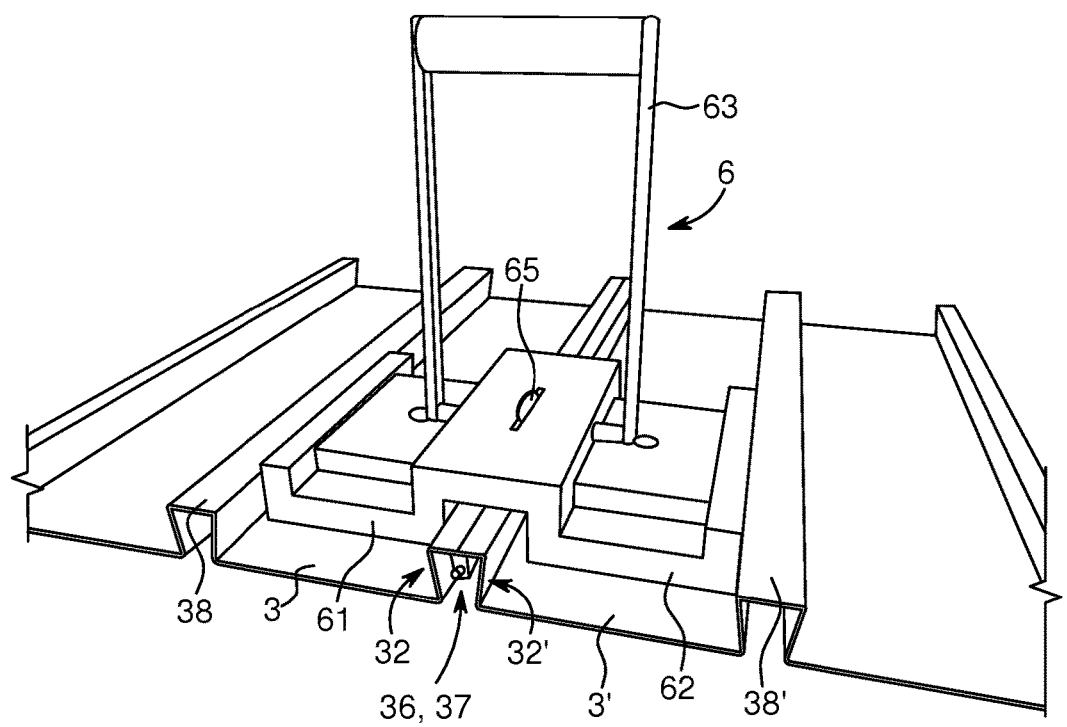
FIG. 11 show the de-mounting tool in a position of use.

A combined assembly and disassembly tool is shown in FIG. 11 when placed on the cover profiles and shown separately in FIGS. 9 and 10. The tool comprises a frame with two support portions 61, 62, which both fit into the profile grooves between a ridge 38 and a side flange 32 of one cover profile 3 and a ridge 38' and a side flange 32' of the next cover profile 3', so that the tool 6 straddles the two side flanges 32, 32' to be interlocked. In the support portions 61, 62 there are provided press rollers 64 which may be brought into an active position by activating the handle 63. By pulling the handle 63 along the assembly line, i.e. the side flanges 32, 32', the press rollers 64 will then push the tongue 37 into the groove 36 and thereby snap-lock the two cover profiles 3, 3' together. The tool 6 is also provided with an off-set central disk 65, which is placed above the assembly line between the two profiles, but off-set relative to the pivot axis of the handle 63 (see FIG. 10). The handle 63 can then be brought into a second active position where the disk is rotated into the assembly line, i.e. forced in between the two side flanges 32, 32' of two assembled cover profiles 3, 3'. The press rollers 64 may at the same time be pressed outwards, i.e. towards the ridges 38, 38' of the profiles 3, 3'. When the tool is then moved along the assembly line, the tongue 37 will then be demounted from the groove and the two cover profiles will thereby be taken apart.

Figure 12:
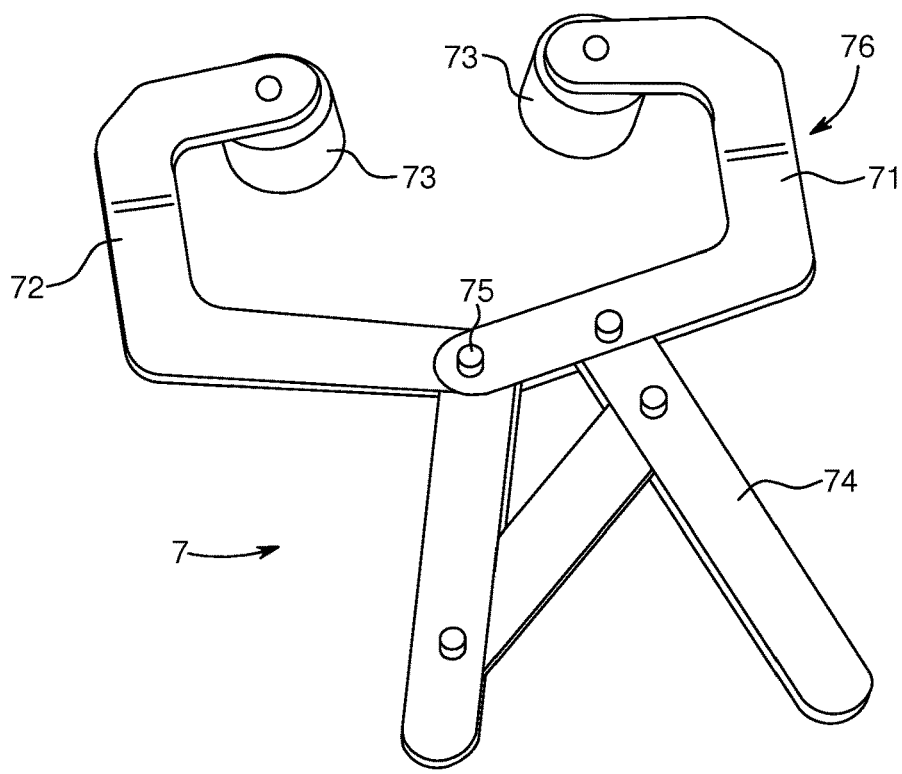
FIG. 12 shows a pressing tool for assembling two profiles of two neighbouring elements.
Figure 13:
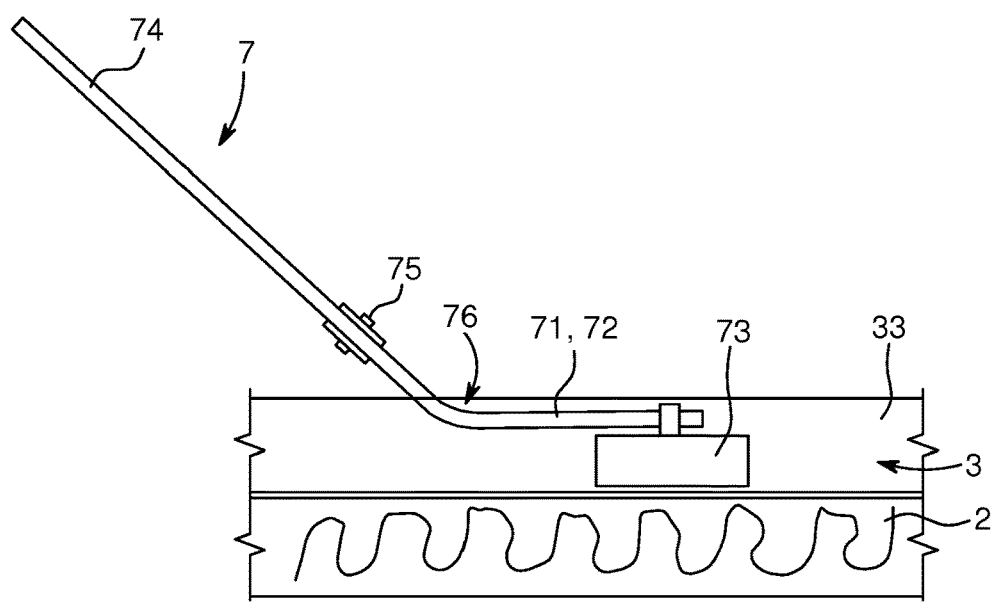
FIG. 13 is a schematic cross-section view of the tool of FIG. 12 during use.

In FIGS. 12 and 13 an alternative assembly tool 7 is shown. This simple gripping tool has a handle section 74 and two gripping arms 71, 72 with press rollers 73 at their distal ends. The arms 71, 72 pivot about a point 75. When the press rollers 73 are engaged on each side of the side flanges 32, the tongue and groove of the two cover profiles 3, 3' may be pressed together by squeezing the handle 74. As it is shown in FIG. 13, the gripping arms 71, 72 have a bend 76 such that the press rollers 73 engage the side flanges 33 of the cover profiles 3 in a different plane than the orientation of the handles 74. This bend is between the pivot point 75 and the press rollers 73 on the arms 71, 72 to ensure that this handheld tool 7 made be operated without colliding with the ridge-like assemble of two side flanges of the two cover profiles 3 to be interlocked together.

Turning again to FIG. 1, the functionality of a bracket for use in connection with the Modular building system will be described. FIG. 1 shows a building element shown as an insulation material 2 provided with cover profiles defining one or more profile openings or profile grooves for receiving mounting brackets therein.

As best seen in FIG. 6, each opening comprises a bottom 31 and rails 32, 33, 38 with side walls 101, 102 having a dovetailed cross section or in other words, having inclined walls 101, 102 which narrow down from the bottom 31 towards the opening of the profile. The side walls 101, 102 hereby form an angle of less than 90° with the cover profile bottom 31.

The building elements can be mounted adjacent each other to form a building system, such as a wall, ceiling or separation deck of a building.

Figure 15:
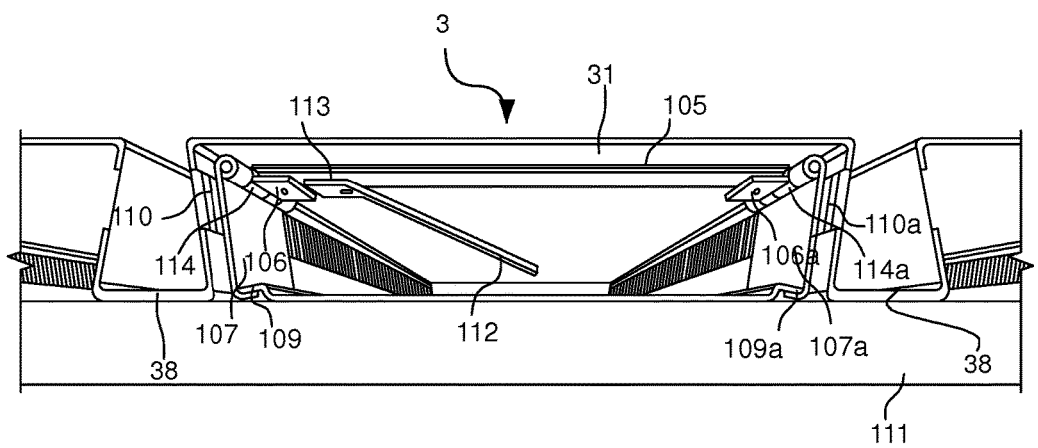

The inside walls 101, 102 of the rails facing towards the opening of the cover profile may be provided with ribs 111, 111a as shown in FIGS. 13 and 15 intended for engaging with the sides of the bracket. The bracket may be provided with complementary ribs (not shown).

Figure 14:
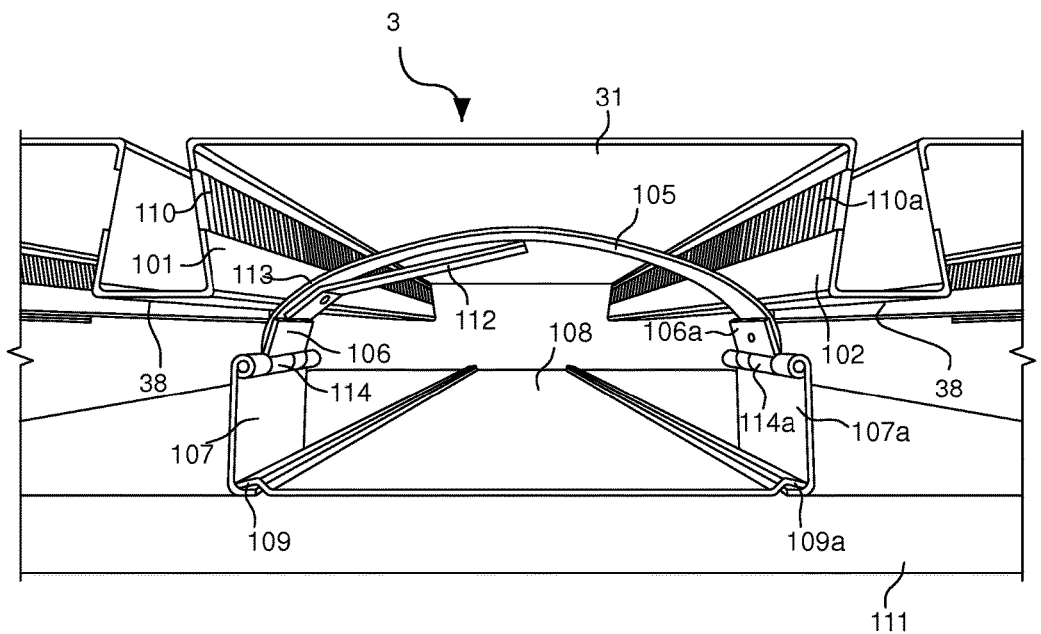
FIG. 14 shows a bracket in a first operation mode for attaching on the building element and FIG. 15 shows the bracket in FIG. 14 in a second operation mode.

Referring to FIGS. 14 and 15, the construction of a first embodiment for a bracket is now explained in detail.

The bracket basically comprises a mounting plate 108, side engagement members 107, 107a and a plate spring 105, which is pivotally hinged at both ends to the innermost edges of the side engagement members 107, 107a. By the term "innermost" is meant the edges facing towards the bottom 31 of the cover profile. At the outermost edge of the side engagement members 107, 7a, the engagement parts 107, 107a, connect to the mounting plate 8.

One or more brackets may be attached to a wall lining 111, such as an exterior inner or outer wall panel, which thereby is mountable to the building element.

The mounting plate 108 has edges 109, 109a shown as bent parts of the mounting part 108. These edges 109, 109a are to engage with the bent edges of the plate-like side engagement members 107, 107a for the retention of the mounting plate 108 between the edges and thereby retain the mounting plate 108 in the bracket between the side engagement members 107, 107a whilst allowing for an angular displacement there between as the bracket is locked in the cover profile (see description thereof below). The mounting plate 108 may extend along the entire length of the cover profile or have a width for instance similar to the side engagement members 107, 107a and/or the plate spring 105. The mounting plate 108 and the side engagement members 107, 107a may be attached in a pivotally engagement either as a permanent attachment or a loose attachment.

The plate spring 105 is of the bi-stable type having a first stable form with a convex curvature as shown in FIG. 14, and a second stable form where the plate spring 105 is straight, as shown in FIG. 15.

The side engagement members 107, 107a end at the innermost top in hinges 114, 114a shaped as rotary joints with plate parts 106, 106a to which the ends of a curved spring 105 is attached whereas the opposite ends of the plate parts are attached on the hinges 114, 114a. It is realised by the invention that the other means of angularly displaceable attachment than hinges may be provided.

Furthermore, the outer sides of the side engagement members 107, 107a may be provided with ribs, not shown, for engagement with the ribs 110, 110a on the cover profiles of the building element.

In FIG. 14, the bracket is shown prior to being inserted in the cover profile of the building element shown in FIG. 1. The inclined walls of the building element engage with ribs on the outer side of the side engagement members 107, 107a (not shown).

When the bracket is guided from the position in FIG. 15 into the cover profile, the convex curved plate spring 105 abuts on the bottom 31 whereas the side engagement members 107,107a are close to the walls of the plate parts 101, 102. As the bracket is then further pressed into the cover profile opening, the plate spring 105 will be caused to transform its shape from the first stable form to the second straight form and thereby cause the side engagement members 107, 107a into engagement with the cover profile side walls 101, 102, preferably even such that the plate spring 105 exercise a spring force on the side engagement members 107, 107a and thereby enhances the surface engagement between the side engagement members 107, 107a and the cover profile side walls 101, 102.

In this way, a very strong coupling is obtained as the spring in straight condition can absorb significant compressive forces, which means that the bracket cannot be removed easily from the cover profile.

The spring is preferably constructed as a bi-stable spring causing the coupling of the bracket to the cover profile being able to be carried out as a "click coupling" with the spring being clicked in place from the position in FIG. 14 to the position in FIG. 15.

In a further embodiment of the invention, a tongue 112 is shown in FIGS. 14 and 15, the tongue is magnetically sensitive. This tongue 112 is attached to the interior surface of the spring 105 near the plate part 106. As shown, the tongue 112 is detached of the spring at its free end.

The function of the tongue 112 is the following:

When the bracket is guided from the position in FIG. 14 to the position in FIG. 15, the tongue 112 will be in the position in FIG. 14 when the spring 105 meets the bottom, in this position the tongue is pointing downwards as it follows the movement of the plate part 106. When the bracket is locked inside the cover profile opening in the position shown in FIG. 15 the tongue 112 points somewhat outwards.

If the tongue is subjected to magnetic forces in the position in FIG. 15, the tongue will be pulled outwards and click the bi-stable spring 105 whereby the plate part 106 can be released from the building element 1 after which the spring will be in the curved position in FIG. 14.

In this way, a hidden mounting of a wall lining 110 can be removed from a building element without use of tools other than a magnet.

It is also to be noted that it is possible to provide spacers (not shown) on the bottom 31 of the cover profile resulting in the spring straightening and leaving a small space between the spring and the bottom 31 upon contact with the spaces.

Aspects

1. A modular building system comprising a plurality of building elements (1), which are assembled to form a building section, such as a wall, a floor and/or a ceiling, said building elements (1) each comprises
   an elongated insulation panel (2) having a first side (23) and an opposite second side (24) with two oppositely positioned end sides (25, 26) and two oppositely positioned panel contact sides (21, 22) therebetween, and at least one of said first and second sides (23, 24) are provided with a cover profile (3), which covers the width of the first side (23) and/or the second side (24), wherein
   said cover profile (3) has a base portion (31) at which the cover profile (3) is attached to the first or second side (23, 24) of the insulation panel (2), and first and second side flange portions (32) on each side of the base portion (31);
   said first side flange portion (32) having a tongue (37) at the side edge (35), and said second side flange portion (32) having a groove (36) complementary to the tongue (37) adapted to receiving and interlocking the tongue (37) of a neighbouring building element (1) and thereby assemble the two neighbouring building elements (1, 1').

2. A building system according to aspect 1, wherein each of the flange portions (32) comprises an inclined inner flange portion (33) extending from the base portion (31) to an intermediate portion (34) parallel to the base portion (31), and from which an outermost side flange (35) is provided which is perpendicular to the base portion (31), and that in said outermost side flange (35) the tongue (37) or groove (36), respectively, is formed.

3. A building system according to aspect 1 or 2, wherein said cover profile (3) is made of one piece of sheet metal which is folded into shape, said sheet preferably having a thickness of 0.5-1.5 mm, more preferably approx. 1.0 mm.

4. A building system according to any of the preceding aspects, wherein a central ridge (38) is provided on the base portion (31), said ridge (38) preferably having a trapezoid cross-sectional shape.

5. A building system according to aspect 4, wherein the assembly of side flange portions (32) of two neighbouring building elements (1, 1') when assembled have the same shape as the ridge (38).

6. A building system according to any of the preceding aspects, wherein the tongue (37) and/or the groove (36) is provided with a coating or a sealant.

7. A building system according to any of the preceding aspects, wherein the insulation panel (2) is made of bound fibrous material, preferably bound mineral wool fibres, such as bound stone wool fibres.

8. A building system according to any of the preceding aspects, wherein the insulation panel (2) is made of bound fibrous material having a density of 60-100 kg/m³, preferably 70-80 kg/m³ and a compression strength perpendicular to the cover profiles surface of >15 kN/m².

9. A building system according to any of the preceding aspects, wherein at least one of the building sections is a horizontally positioned floor subassembly of the building elements and wherein at least one second building section is a wall subassembly of building elements (1) which is mounted on said floor subassembly via an assembly profile element (4).

10. A building system according to aspect 9, wherein the assembly profile element (4) comprises an exterior first side profile (41) with a receiving groove, an interior second side profile (42) with a receiving groove, and with a central profile panel (43) of insulation material mounted between said side profiles (41, 42) and mounted in the receiving grooves.

11. A building system according to aspect 10, wherein said central profile panel (43) is made of a bound mineral fibrous material, more preferably said mineral fibrous material having a density of approx. 450-500 kg/m³.

12. A building system according to aspect 10 or 11, wherein the interior second side profile (42) also comprises an internal volume (44) for the accommodation of building components.

13. A method of assembling building elements (1), which are assembled to form a building section, such as a wall, a floor and/or a ceiling, said building elements (1) each comprises an elongated insulation panel (2) having a first side (23) and an opposite second side (24) with two oppositely positioned end sides (25, 26) and two oppositely positioned panel contact sides (21, 22) therebetween, and at least one of said first and second sides (23, 24) are provided with a cover profile (3), which covers the width of the first side (23) and/or the second side (24), wherein said cover profile (3) has a base portion (31) at which the cover profile (3) is attached to the first or second side (23, 24) of the insulation panel (2), and first and second side flange portions (32) on each side of the base portion (31);

said first side flange portion (32) having a tongue (37) at the side edge (35), and said second side flange portion (32) having a groove (36) complementary to the tongue (37) adapted to receiving and interlocking the tongue (37) of a neighbouring building element (1) and thereby assemble the two neighbouring building elements (1, 1'); said method comprising the steps of providing a first building element (1) and a second building element (1') with their panel contact sides (21, 22) abutting each other, aligning the tongue (37, 37') of the cover profile (3) on the first building element (1) with the groove (36, 36') in the cover profile (3') of the second building element (1'), and then pressing the tongue (37, 37') into the groove (36, 36') along the entire cover profile length and thereby assemble the two neighbouring building elements (1, 1').

14. A method according to aspect 13, where the building elements are provided with cover profiles (3) on both their first and their second sides (23, 24), and that the step of pressing is performed on both said sides (23, 24) of the building elements (1, 1') for the assembly of the two building elements (1, 1').

15. A method according to aspect 13 or 14, where the assembly comprises the step of pressing on the inclined flange portions (33, 33') of the side flange portions (32, 32') on the two neighbouring cover profiles (3, 3') carrying the tongue (37, 37') and groove (36, 36'), respectively.

16. A method of assembling building elements (1), which are assembled to form a building section, such as a wall, a floor and/or a ceiling, said building elements (1) each comprises an elongated insulation panel (2) having a first side (23) and an opposite second side (24) with two oppositely positioned end sides (25, 26) and two oppositely positioned panel contact sides (21, 22) therebetween, and at least one of said first and second sides (23, 24) are provided with a cover profile (3), which covers the width of the first side (23) and/or the second side (24), wherein said cover profile (3) has a base portion (31) at which the cover profile (3) is attached to the first or second side (23, 24) of the insulation panel (2), and first and second side flange portions (32) on each side of the base portion (31);

said first side flange portion (32) having a tongue (37) at the side edge (35), and said second side flange portion (32) having a groove (36) complementary to the tongue (37) adapted to receiving and interlocking the tongue (37) of a neighbouring building element (1) and thereby assemble the two neighbouring building elements (1, 1'); said method comprising the steps of providing the building elements (1, 1') assembled together at the cover profiles, and then disassembling of the building system is performed by forcing the tongue (37, 37') out of the groove (36, 36') in the profile assembly.

The invention claimed is:

1. A modular building system comprising a plurality of building elements, which are assembled to form a building section, said building elements, being for use with an elongated insulation panel having a first side and an opposite second side with two oppositely positioned end sides and two oppositely positioned panel contact sides therebetween, at least one of said elements comprises: cover profiles, each of which are adapted to cover the width of the first side and the second side, respectively, wherein at least one of said cover profiles has a base portion with a contact surface adapted to be attached to the first or second side of the insulation panel, and has first and second side flange portions on each side edge of the base portion arranged on a same side of the base portion that is opposite the contact surface; said first flange portion having interconnecting means for interconnecting with a second flange portion provided on a neighboring building element so that the interconnected flange portions in cross section define a longitudinal dove tail.

2. A building system according to claim 1, wherein said first side flange portion having a tongue at the side edge, and said second side flange portion having a groove complementary to the tongue adapted to receiving and interlocking the tongue of a neighboring building element and thereby assemble the two neighboring building elements.

3. A building system according to claim 2, wherein each of the flange portions comprises an inclined inner flange portion extending from the base portion to an intermediate portion parallel to the base portion, and from which an outermost side flange is provided which is perpendicular to the base portion, and that in said outermost side flange the tongue or groove, respectively, is formed.

4. A building system according to claim 2, wherein said cover profile is made of one piece of sheet metal which is folded into shape, said sheet having a thickness of 0.5-1.5 mm.

5. A building system according to claim 1, wherein a central ridge is provided on the base portion, said ridge having a trapezoid cross-sectional shape.

6. A building system according to claim 5, wherein the assembly of side flange portions of two neighboring building elements when assembled have the same shape as the ridge.

7. A building system according to claim 1, wherein the tongue and/or the groove is provided with a coating or a sealant.

8. A building system according to claim 1, wherein the insulation panel is made of bound fibrous material of the materials consisting of: bound mineral wool fibers, bound stone, and wool fibers.

9. A building system according to claim 1, wherein the insulation panel is made of bound fibrous material having a density of 60-100 kg/m$^3$, and a compression strength perpendicular to the cover profiles surface of >15 kN/m$^2$.

10. A building system according to claim 1, wherein at least one of the building sections is a horizontally positioned floor subassembly of the building elements and wherein at least one second building section is a wall subassembly of building elements which is mounted on said floor subassembly via an assembly profile element.

11. A building system according to claim 10, wherein the assembly profile element comprises an exterior first side profile with a receiving groove, an interior second side profile with a receiving groove, and with a central profile panel of insulation material mounted between said side profiles and mounted in the receiving grooves.

12. A building system according to claim 11, wherein said central profile panel is made of a bound mineral fibrous material, said mineral fibrous material having a density of approx. 450-500 kg/m$^3$.

13. A building system according to claim 11, wherein the interior second side profile also comprises an internal volume for the accommodation of building components.

14. A method of assembling building elements, which are assembled to form a building section, said building elements each comprises an elongated panel having a first side and an opposite second side with two oppositely positioned end sides and two oppositely positioned panel contact sides therebetween, and at least one of said first and second sides are provided with a cover profile, which covers the width of the first side and/or a cover profile, which covers the width of the second side, wherein said cover profile has a base portion with a contact surface at which the cover profile is attached to the first or second side of the panel, and first and second side flange portions on each side of the base portion arranged on a same side of the base portion that is opposite the contact surface; said first flange portion having interconnecting means for interconnecting with a second flange portion having complementary coupling means provided on a neighboring building element so that the interconnected flange portions in cross section define a longitudinal dove tail; said method comprising the steps of —providing a first building element and a second building element with their panel contact sides abutting each other, —aligning the first side flange portion interconnecting means of the cover profile on the first building element with the complementary coupling means in the cover profile of the second building element, and then —connecting the first side flange portion interconnecting means of the cover profile on the first building element with the complementary coupling means in the cover profile of the second building element along the entire cover profile length and thereby assemble the two neighboring building elements.

15. A method according to claim 14 where the building elements are provided with cover profiles each comprises: first side flange portion having a tongue at the side edge, and said second side flange portion having a groove complementary to the tongue adapted to receiving and interlocking the tongue of a neighboring building element and thereby assemble the two neighboring building elements; said method comprising the steps of providing a first building element and a second building element with their panel contact sides abutting each other, aligning the tongue of the cover profile on the first building element with the groove in the cover profile of the second building element, and then pressing the tongue into the groove along the entire cover profile length and thereby assemble the two neighboring building elements.

16. A method according to claim 15, where the building elements are provided with cover profiles on both their first and their second sides, and that the step of pressing is performed on both said sides of the building elements for the assembly of the two building elements.

17. A method according to claim 15, where the assembly comprises the step of pressing on inclined flange portions of the side flange portions on the two neighboring cover profiles carrying the tongue and groove, respectively.

18. A method of assembling building elements, which are assembled to form a building section, said building elements each comprises an elongated insulation panel having a first side and an opposite second side with two oppositely positioned end sides and two oppositely positioned panel contact sides therebetween, and at least one of said first and second sides are provided with a cover profile, which covers the width of the first side and/or the second side, wherein said cover profile has a base portion at which the cover profile is attached to the first or second side of the insulation panel, and first and second side flange portions on each side of the base portion; said first side flange portion having a tongue at the side edge, and said second side flange portion having a groove complementary to the tongue adapted to receiving and interlocking the tongue of a neighboring building element and thereby assemble the two neighboring building elements; said method comprising the steps of —providing the building elements assembled together at the cover profiles, and then —disassembling of the building system is performed by forcing the tongue out of the groove in the profile assembly.

* * * * *